(12) United States Patent
Murray et al.

(10) Patent No.: US 7,113,989 B2
(45) Date of Patent: Sep. 26, 2006

(54) COMMAND LINE INTERFACE PROCESSOR

(75) Inventors: Christopher (Warren) Murray, Ottawa (CA); David Wing-Chung Chan, Nepean (CA); Kevin Edgar Daniel Landry, Ottawa (CA); Felix Katz, Ottawa (CA); Chuong Ngoc Ngo, Ottawa (CA); Attaullah Zabihi, Ottawa (CA)

(73) Assignee: Alcatel Canada Inc., Kanata (CA)

( * ) Notice: Subject to any disclaimer, the term of this patent is extended or adjusted under 35 U.S.C. 154(b) by 859 days.

(21) Appl. No.: 10/115,900

(22) Filed: Apr. 5, 2002

(65) Prior Publication Data

US 2003/0115304 A1    Jun. 19, 2003

(30) Foreign Application Priority Data

Dec. 19, 2001    (CA)    ................................ 2365436

(51) Int. Cl.
G06F 15/173    (2006.01)
(52) U.S. Cl. ................. 709/224; 709/220; 709/223; 370/241; 370/254; 707/100
(58) Field of Classification Search ............. 709/220, 709/223, 224; 707/100; 370/241, 254
See application file for complete search history.

(56) References Cited

U.S. PATENT DOCUMENTS

| 5,533,116 | A | * | 7/1996 | Vesterinen | 379/240 |
| 5,764,955 | A | * | 6/1998 | Doolan | 709/223 |
| 6,061,332 | A | * | 5/2000 | Branton et al. | 370/241 |
| 6,239,718 | B1 | | 5/2001 | Hoyt et al. | |
| 6,393,475 | B1 | * | 5/2002 | Leong et al. | 709/223 |

(Continued)

FOREIGN PATENT DOCUMENTS

EP    1 030 251 A1    8/2000

(Continued)

OTHER PUBLICATIONS

Israel R et al: "Configuration Management of Large IP Telephony Networks" IEEE, Apr. 10, 2000, pp. 435-446.

*Primary Examiner*—ThuHa Nguyen
(74) *Attorney, Agent, or Firm*—Marks & Clerk; S. Mark Budd (57) ABSTRACT

A method of interacting with a managed data network entity is provided. The method includes a sequence of steps. A change in the operational state of the managed data network entity is detected. A CLI dictionary entry is retrieved form a CLI dictionary associated with the data network entity. Based on the retrieved CLI dictionary entry, CLI commands are extracted therefrom to configure the managed data network entity to reflect the detected change in the operational state. A CLI command sequence is built from the extracted CLI commands. Each CLI command in the command sequence is sent to the managed data network entity for execution. CLI command responses are monitored. Based on a successful execution of CLI commands send, subsequent CLI commands in the CLI command sequence are sent for execution. The solution provides automated configuration management of data network entities from different vendors when SNMP is not a viable option. The automation eliminates manual CLI command entry in providing network management and service provisioning solutions, provides support for multi-vendor equipment by processing multiple CLI command vocabulary and grammar specifications in the CLI command dictionary. The solution reduces data network entity management costs, downtime, and training time for analysts. The advantages are derived from the ability to add CLI commands to the CLI dictionary providing support for new types of data network entities with human readable code greatly improving the development and maintenance of the network management and service provisioning solution.

19 Claims, 4 Drawing Sheets

U.S. PATENT DOCUMENTS

| | | | |
|---|---|---|---|
| 2003/0048287 A1* | 3/2003 | Little et al. | 345/705 |
| 2003/0135508 A1* | 7/2003 | Chorafakis et al. | 707/100 |
| 2004/0002880 A1* | 1/2004 | Jones | 705/7 |
| 2004/0158621 A1* | 8/2004 | Reyna | 709/220 |

FOREIGN PATENT DOCUMENTS

| | | |
|---|---|---|
| WO | WO 93/18598 | 9/1993 |

* cited by examiner

COMMAND LINE INTERFACE PROCESSOR

FIELD OF THE INVENTION

The invention relates to data network management and in particular to command driven data network management.

BACKGROUND OF THE INVENTION

In the field of data network management, data transport networks are made up of a collection of managed data transport equipment. Data services are provisioned over the managed data transport equipment.

In a competitive market place, due to a recent explosive technological development, the network management and service provisioning task is complicated by many factors including: multiple data network equipment vendors having multiple approaches in implementing the data network equipment; a multitude of data transport technologies, with each vendor specializing in a sub-group of the multitude of data transport technologies; a multitude of network management and service provisioning protocols, with each vendor implementing only a sub-group of the multitude of network management and service provisioning protocols; a multitude of auxiliary network management and service provisioning equipment employing yet another multitude of network management and service provisioning technologies; etc.

Data transport equipment includes, but is not limited to: data switching equipment, routers, bridges, access nodes providing a multiplexing function, Remote Access Servers (RAS), distribution nodes providing a demultiplexing function, Customer Premise Equipment (CPE), etc. with next generation data transport equipment in development.

Figure 1:
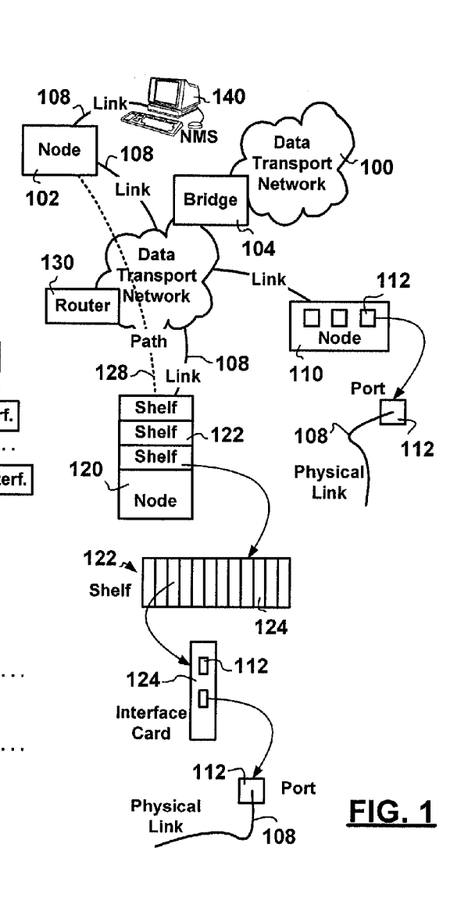
FIG. 1 is a schematic diagram showing data network elements implementing connected data transport networks.

With regards to data network equipment, for example data switching nodes schematically shown in FIG. 1, a vendor may chose to implement an integral device 110 having a data switching processor and a group of ports 112, while another vendor may chose a customizable implementation of a data switching node 120 including: a switching fabric, an equipment rack divided into shelves, each shelf 122 having slot connectors for connection with interface cards, each interface card 124 having at least one port 112. Although conceptually the two data switching nodes 110 and 120 provide the same data switching function, each implementation is adapted for a different environment: the former data switching node 110 being more adapted to provide enterprise solutions as a private data network node, perhaps being further adapted to enable access to public data services; while the latter data switching node 120 is better adapted for high data throughput in the core of public data transport networks. Typically the former (110) implements a small number of data transport protocols while for the latter (120), data transport protocols are implemented on interface cards 124 and/or ports 112—providing for a flexible deployment thereof. All data network equipment is subject to design choices which are bound to be different from vendor to vendor.

Data transport technologies include: electrical transmission of data via copper pairs, coaxial cable, etc: optical transmission of data via optical cables; free space optical interconnects, etc.; wireless transmission of data via radio modems, microwave links, wireless Local Area Networking (LAN), etc.; with next generation data transport technologies under development.

Data transport protocols used to convey data between data transport equipment includes: Internet Protocol (IP), Ethernet technologies, Token-Ring technologies, Fiber Distributed Data Interface (FDDI), Asynchronous Transmission Mode (ATM), Synchronous Optical NETwork (SONET) transmission protocol, Frame Relay (FR), X-25, Time Division Multiplexing (TDM) transmission protocol, Packet-Over-SONET (POS), Multi-Protocol Label Switching (MPLS), etc. with next generation data transport protocols under development.

The physical data network equipment alluded to above is part of a larger body of managed data network entities enabling the provision of data services. The data network entities also include, but are not limited to: virtual routers, logical ports, logical interfaces, end-to-end data links, paths, virtual circuits, virtual paths, etc.

Network management and service provisioning enabling technologies include, but are not limited to protocols: Simple Network Management Protocol (SNMP), Common Management Information Protocol (CMIP), Command Line Interface (CLI), etc.; as well as devices: special function servers, centralized databases, distributed databases, relational databases, directories, network management systems, etc. with next generation devices and technologies under development.

Network management and service provisioning solutions include Network Management Systems (NMS) 130 enabled via special purpose software applications coded to configure and control the above mentioned data network entities. Such software applications include, but are not limited to: inventory reporting, configuration management, statistics gathering, performance reporting, fault management, network surveillance, service provisioning, billing & accounting, security enforcement, etc.

It is a daunting task to provide network management and service provisioning solutions taking into account the permutations and combinations of the elements presented above. Prior art approaches to providing network management and service provisioning solutions include the coding of hundreds of software applications with knowledge of hundreds of data networking entities using tens of data transmission and network management protocols. Some prior art solutions attempt to code all-encompassing large monolithic network management and service provisioning software applications.

Coding, deploying, maintaining, and extending such software applications for network management and service provisioning has been and continues to be an enormous undertaking as well as an extremely complex procedure. Such software applications require a large number of man-hours to create, frequently are delivered with numerous problems, and are difficult to modify and/or support. The difficulty in creating and supporting large applications is primarily due to the inability of existing software development paradigms to provide a simplification of the software development process. In accordance with current coding paradigms, the complexity of the software applications has been shown to increase as an exponential function of the number of different operations that are expected to be performed. Large programming efforts suffer in terms of reasonable performance, reliability, cost of development, and reasonable development cycles.

Object Oriented Programming (OOP) attempts to improve productivity whenever a problem can be simplified by decomposing it into a set of black-box objects. Object oriented programming depends heavily upon the benefits of data hiding, inheritance, and polymorphism to simplify software design. If a network management and service provisioning solution cannot be subdivided into objects, object oriented programming does not offer significant productivity improvements. Moreover, heavy reliance on object oriented programming to achieve compact code intending to reduce the size of software applications and perhaps development time, suffers from deeply nested function calls which creates a processing overhead leading to inefficient code. Deep nesting of function calls obscures the implementation paradigms used; thereby negatively impacting code debugging, code maintenance, and further development thereof.

Every data network entity has operational parameters associated therewith. Associations between data network entities are also made to enable: service provisioning (signaling, data transport, billing, etc.), providing redundancy (equipment, transport, bandwidth, etc.) as well as providing network management related data transport (network status updates, alarms, etc.)

In the field of data network management, typically data network elements have a network management interface complying to the SNMP protocol mentioned above. There are data network elements which do not support the SNMP protocol either by design or because these devices have been deployed prior to the standardization of the SNMP protocol. Also there are data network elements which do support the SNMP protocol, but by design these devices do not support all SNMP capabilities. The ability to configure data network elements using a Command Line Interface (CLI) is more common. The CLI is a text based human-machine mode of interaction making use of string commands and textual display of information. Typically CLI interfaces are used by an analyst to manually enter CLI commands to configure and control a single data network element for management thereof and in provisioning of data network services therethrough. The entry of CLI commands is considered to be a lengthy and error prone procedure. The industry has been searching for methods to automate CLI based configuration and control tasks.

A development attempt towards this end has been made through the establishment of the SNMP protocol as mentioned above. Although the SNMP protocol has been established, it is not implemented on all data network equipment, and not all data network equipment implements all SNMP capabilities.

Various data network element manufacturers have provided an interface to configure a data network element through the CLI interface. Such software applications tend to be proprietary and tend to address the configuration of one particular data network element as it was seen fit by the equipment vendor at the time of the development. Typically, such proprietary interfaces are non-extensible and do not lend themselves to integrated management of data network resources rendering their usefulness very limited.

Known attempts of configuration and control of data network elements includes a script based technique proposed by CISCO Systems Inc. The methods used include the manual creation of batch file scripts from CLI commands, where each script addresses a particular change in the configuration of a particular data network element. Such a script of CLI commands is downloaded to the particular data network element and it is issued for execution to carry out the desired changes. This attempt relies on the fact that all CISCO data network elements use the same set of CLI commands known as a vocabulary and grammar. Such solutions tend to be limited to a particular vendor equipment, i.e. CISCO routers. Furthermore, the scripts are issued with the expectation that the desired change is carried out.

Typically CLI commands return command completion codes including error codes, which have to be returned and interpreted by an analyst to make a decision whether the issued commands have had the desired effect. In issuing scripts to be executed, as mentioned above, the technique typically does not provide command completion code processing. Scripts including error message processing tend to be fairly complicated requiring a lot of development and maintenance.

From time-to-time, as data network elements are updated, the update typically also introduces changes to the CLI vocabulary and/or grammar. The use of complicated scripts tends to hinder the configuration and control as the scripts also have to be updated to reflect changes in the CLI vocabulary and/or grammar.

Other data network management software vendors have taken other approaches in implementing the network management using CLI commands. Service Activator by Orchestream Holdings Plc. makes use of device driver software that allows a CISCO data network element specific configuration to be made therethrough. Each device driver includes specific application code for managing a data network element. The device driver code is used to extract a current state of a data network element, compare the currently reported state against a virtual state held by network management and service provisioning software, generate a group of CLI commands which are necessary in synchronizing the virtual and real states, and sends the group of CLI commands to be executed by the data network element. The process iterates until the reported current state matches the virtual state. This attempt does not address errors generated by the issuing of CLI commands, rather derives alarms from discrepancies between the current state and the virtual state. This attempt makes use of hardcoded device drivers which contain machine readable object code unintelligible to an analyst attempting to debug such a driver.

These efforts are all laudable, but the productivity of the development and maintenance of such complex attempts for network management and service provisioning suffers. In particular, support for new data network entities, updated CLI vocabularies and/or CLI grammar, requires the whole software application to be re-compiled and re-deployed. There is always a risk of incorporating further errors in existing code when dealing with such large software applications thereby requiring extensive regression testing to verify the integrity of the existing code.

There therefore is a need to devise improved methods of software application code development and maintenance taking into account the above mentioned complexities.

SUMMARY OF THE INVENTION

In accordance with an aspect of the invention, a network management and service provisioning Command Line Interface (CLI) framework is provided. The framework includes: a processor, a dictionary and a communications module. The processor is responsive to at least one notification. The dictionary has a plurality of dictionary entries. The plurality of dictionary entries hold vocabulary and grammar specifications of a plurality of commands used in interacting with at least one managed data network entity. The communications module sends in sequence for execution and monitors the execution of, at least one selection of the plurality of commands generated in response to the notification as specified in the plurality of dictionary entries. The network management and service provisioning solution provided makes abstraction of the at least one managed data network entity.

In accordance with another aspect of the invention, a method of managing a data network entity in providing a network management and service provisioning solution is presented. The method includes a sequence of steps. At least one specification held in at least one dictionary entry associated with the managed data network entity, is retrieved. A sequence of commands required to configure the managed data network entity is derived from the at least one specification. Each one of the commands in the derived sequence are sent to the managed data network entity for execution. And, the execution of each one of the commands sent is monitored. The sending of the commands to the managed data network entity further includes establishing a communication session with a data network element comprising the managed data network entity.

In accordance with yet another aspect of the invention, the framework further comprises a parser for the run-time loading of grammar files and the extraction of vocabulary and grammar specifications therefrom to register types of managed data network entities with the network management and service provisioning solution. The extracted vocabulary and grammar specifications are used to populate the dictionary entries. The .grammar files are preferably human readable.

The solution provides automated configuration management of data network entities from different vendors when SNMP is not a viable option. The automation eliminates manual CLI command entry, provides support for multi-vendor equipment by using multiple CLI command vocabularies and CLI command dictionaries. The solution reduces data network entity management costs, downtime, and training time for analysts. The advantages are derived from an ability to add CLI commands to the dictionary, on demand, providing support for new types of data network entities with human readable code greatly improving the development and maintenance of the network management and service provisioning solution.

BRIEF DESCRIPTION OF THE DRAWINGS

The features and advantages of the invention will become more apparent from the following detailed description of the preferred embodiment(s) with reference to the attached diagrams wherein.

It will be noted that in the attached diagrams like features bear similar labels.

DETAILED DESCRIPTION OF THE EMBODIMENTS

FIG. 1 is a schematic diagram showing data network elements implementing connected data transport networks.

Data network nodes 102, 110, 120 are physically interconnected in the data transport network 100 via physical links 108. Data transport networks 100 may be bridged via bridge data network nodes 104 to enable data exchange therebetween. Connected data transport networks 100 can be grouped defining areas of focus and influence for the purposes of network management and service provisioning, known as network partitions 106.

Physical links 108 provide Open Systems Interconnection (OSI) Layer-1 connectivity between data network nodes 102/104/110/120 physically conveying data for OSI Layer-2 data links between nodes 102/110/120 end-to-end. A Layer-2 data link may be provisioned over at least one physical data link 108—the sequence of physical data links 108 used representing an OSI Layer-3 path 128.

Network management and service provisioning is typically performed with the aid of at least one Network Management System (NMS) 130 connected to at least one node 102 associated with a data transport network 100.

Figure 2:
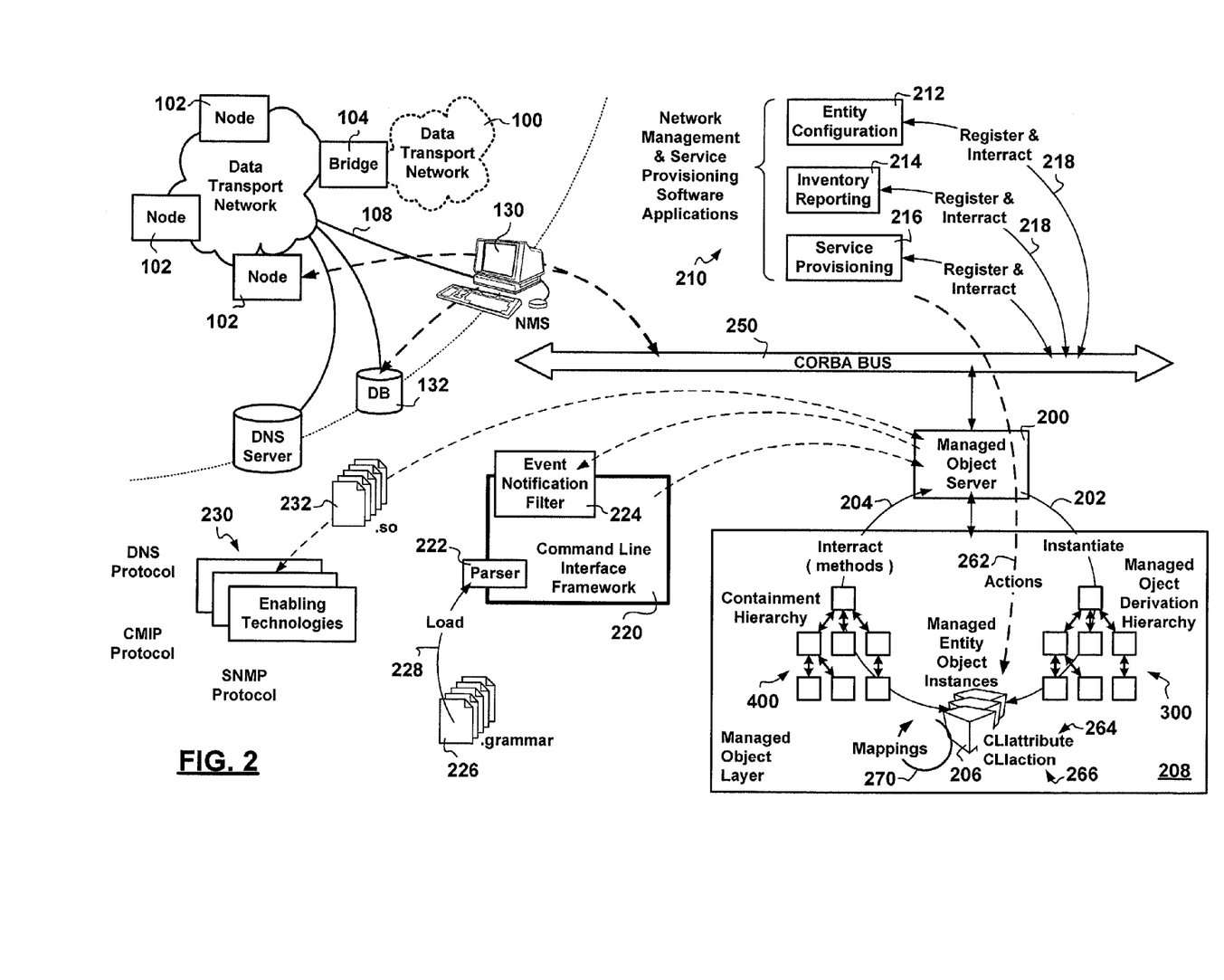
FIG. 2 is a schematic diagram showing elements implementing a network management and service provisioning solution in accordance with a preferred embodiment of the invention.

FIG. 2 is a schematic diagram showing elements implementing a network management and service provisioning solution.

A Managed Object Server (MOS) 200 facilitates the implementation of a software development methodology for coding complex software applications 210 relating to network management and service provisioning.

The MOS 200 implements a new architecture for providing network management and service provisioning solutions. The new architecture categorizes the above presented elements into:

Manageable data network entities representative of field installed data network entities to be configured and controlled in providing network management and service provisioning solutions. The field installed data network entities include:

i. Physical data network equipment installed in the field such as: nodes 102/104, routers, switches, hubs, OC-3 links 108, etc., and ii. Logical data network entities associated with data network equipment installed in the field such as: network partitions 106, paths 128, virtual circuits, virtual routers etc.;

Network management and service provisioning software applications 210 used to configure and control the manageable data network entities. The software applications 210 include as mentioned above: inventory reporting 214, configuration management 212, statistics gathering, performance reporting, fault management, network surveillance, service provisioning 216, billing & accounting, security enforcement, etc. Human-machine interaction with the software applications 210 is provided to an analyst via the at least one NMS 130;

Network management enabling technologies 230 providing interaction between manageable entities and field installed physical data network entities. Enabling technologies 230 include:
  i. Data network management and service provisioning protocols: SNMP, CMIP, CLI, DNS, etc., and
  ii. Data network management and service provisioning devices: databases, DNS servers, etc.

The network management and service provisioning solution may be command driven as specified by the software application 210, as well as event driven as a current state of the managed data transport network(s) in the realm of management changes.

The enabling technologies 230 include support for a concept referred to as "persistence". As mentioned above, each data network entity including data network equipment has an associated group of parameters. These parameters either have an effect on the operation of the data network entity or label the data network entity. The persistence concept encompasses the storage of, access to, reading, writing, modifying, synchronization/reconciliation, etc. of persistence parameters to control the operation of data network entities.

The persistence parameters can be stored in a network management and service provisioning database 132, as well as in registers associated with the managed physical data network equipment installed in the field. The persistence access to, reading of, writing of, modification of these parameters is provided via the enabling technologies 230 including but not limited to the data network management and service provisioning protocols mentioned above. Persistence reconciliation and synchronization is performed, for example, between a persistence database and a persistence value held in a volatile register ensuring a correct record keeping thereof, fast access to the persisted information and backup thereof. Distributed storage of persistence information is also used in reconfiguring data network equipment subsequent to network failures. Persistence reconciliation and synchronization may be envisioned to be performed between end data network equipment associated for example with a physical link, a data link, a path, a service, etc.

The persistence concept also encompasses special persistence types such as: constant persistence which can only be initialized but not modified or written to subsequently; as well as derived persistence which is not stored but rather calculated from other persistence values when needed.

In accordance with the preferred embodiment of the invention, coding techniques used in support of the preferred software development methodology enable on-demand loading of enabling technology support. These coding techniques implement what are known in the art as software application plug-ins such as, but not limited to: SNMP enabling technology plug-ins, CMIP enabling technology plug-ins, database plug-ins, etc. These plug-ins enable persistence support and are also referred to as persistence entity plug-ins. The persistence plug-ins 232 capture data and methods necessary to interact with actual persistence entities (databases, registers, etc.) Each persistence plug-in shared library (.so) file 232 contains a coded description of the functionality it is capable to provide.

In accordance with the preferred software development methodology, the persistence plug-ins 232 are coded in a general fashion without making special reference to the manageable data network entities or the software applications 210. The persistence plug-ins 232 are not to be linked-in with the software application 210 object code. Preferably, persistence plug-ins are provided as shared object code library (.so) files 232 which register 234 with the MOS 200 for on-demand loading thereof.

In accordance with the preferred software development methodology, the software applications 210 are also coded in a general fashion implementing the functionality provided while only making reference to manageable data network entities (via directives) in a high level abstract implementation of the functionality provided. Further details of the software development methodology regarding the software application 210 access to instances of manageable data network entities can be found in: co-pending patent application filed on Dec. 19, 2001 with the United States Patent and Trademark Office by the Applicant entitled "NETWORK MANAGEMENT SYSTEM ARCHITECTURE" bearing Ser. No. 10/021,080, and co-pending patent application filed on Dec. 19, 2001 with the United States Patent and Trademark Office by the Applicant entitled "METHOD OF INVOKING POLYMORPHIC OPERATIONS IN A STATICALLY TYPED LANGUAGE" bearing Ser. No. 10/021,629.

Specific information regarding manageable data network entities is held by the MOS 200 which instantiates 202, at run-time, and provides interaction 204 with, instances of managed object entities 206. In particular, the software applications 210 register 218 with the MOS 200 which augments the functionality thereof in providing access to instances 206 of specific manageable entities and methods associated therewith.

The managed object entity instances 206 exist in a Managed Object Layer (MOL) 208 associated with the MOS 200 which acts as an access facilitator.

The overall interaction 218/204 between the software applications 210 and the managed object type instances 206, changes the data network state and/or provides an update of the data network state by making use of the enabling technologies 230.

The instantiation 202 of the managed object types (300) is performed subsequent to the discovery of managed data network entities in the realm of influence of the network management and service provisioning solution. The discovery of physical managed entities is provided via software applications 210 such as the inventory reporting software application 214. The instantiation 202 of managed entity objects may also be a result of the interaction of an analyst with the NMS 130 via the software applications 210.

Figure 3:
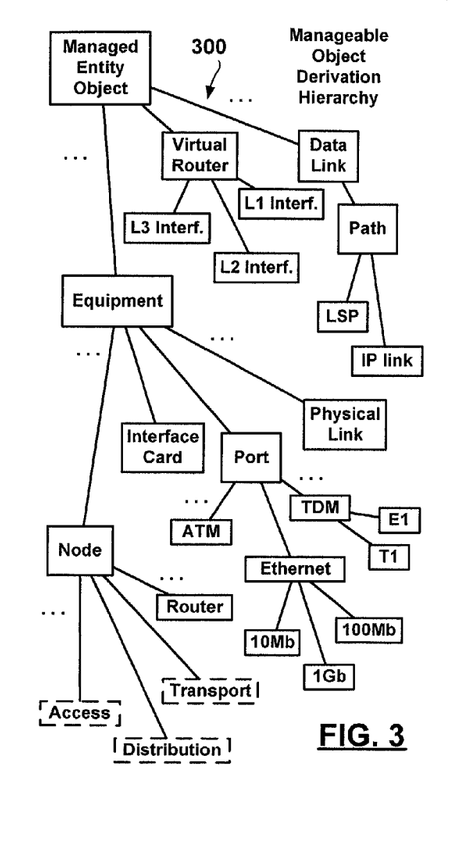
FIG. 3 is a schematic diagram showing a managed entity object hierarchy used in providing the network management and service provisioning solution in accordance with the preferred embodiment of the invention.

The MOL 208 makes use of a managed entity object derivation hierarchy 300 shown in FIG. 3 in instantiating 202 managed entity objects. The manageable entity object instances 206 define a managed object entity containment hierarchy 400 presented in FIG. 4. The containment hierarchy 400 may exists only as a combination of associations between instances of managed object entities 206 (but is not limited thereto).

As mentioned above, a specific enabling technology 230 may be used to provide persistence support if the field installed physical data network entity implements and has that particular enabling technology activated. CLI enabling technology support is the focus of the present invention. As mentioned above, Command Line Interfaces although not standardized between different vendor equipment, not even for equipment manufactured by a particular vendor, are more prevalent than standardized SNMP support, standardized CMIP support, etc.

In accordance with a preferred embodiment of the invention, a CLI framework 220 is provided. The CLI framework 220 provides command line interface configuration (i.e.

persistence) support to managed entity object instances 206 and therefore by extension to software applications 210.

The amount of configuration and/or surveillance of persisted information associated with even the simplest of managed data transport networks tends to be very large. In accordance with a preferred embodiment of the invention, the CLI framework 220 consolidates persistence support for managed data network entities across multi-vendor equipment as well as across multiple vendor specific equipment types. The CLI framework 220 may include, but is not limited to a combination of hardware and software application code.

Each software application 210 is a client entity of the MOS 200. In the interaction 218/204, an MOS 200 client requests at least one action 262 to be invoked on a managed entity object instance 206 to change operational parameters as well as to change operational states of the corresponding managed data network entity. A variety of such actions 262 may be used, each of which may represent either a "basic action" or may be decomposed in a group of basic actions. A non-exhaustive list of basic actions 262 includes: create, update, read, delete actions, etc. In accordance with the preferred software development methodology, basic actions 262 implementations transcend each one of the software applications 210 registered with the MOS 200 leading to a generic implementation.

In accordance with the invention, the provision of CLI configuration of managed data network entities is enabled through special purpose CLIattributes 264 and methods implemented by the manageable entity objects (300). The special purpose methods include CLI specific side-effect actions 266 such as but not limited to: CLIcreation, CLIdeletion, CLIread, CLIupdate actions, etc.

A mapping function 270 is performed between basic actions 262 and CLIactions 266. CLImapping specifications are checked 270 to determine whether the specific basic actions 262 need CLI persistence support. Some basic actions 262 may only change CLIattributes 264. The change in CLIattributes 264 may in turn trigger CLIactions 266.

The mapping function 270 is necessary as the basic actions 262 may be atomic with respect to the software applications 210 while at the same time the basic actions 262 represent high level actions to be implemented via atomic CLI actions 266. The invention makes use of a special purpose CLImapping attributes 264 which hold mapping specifications.

Figure 4:
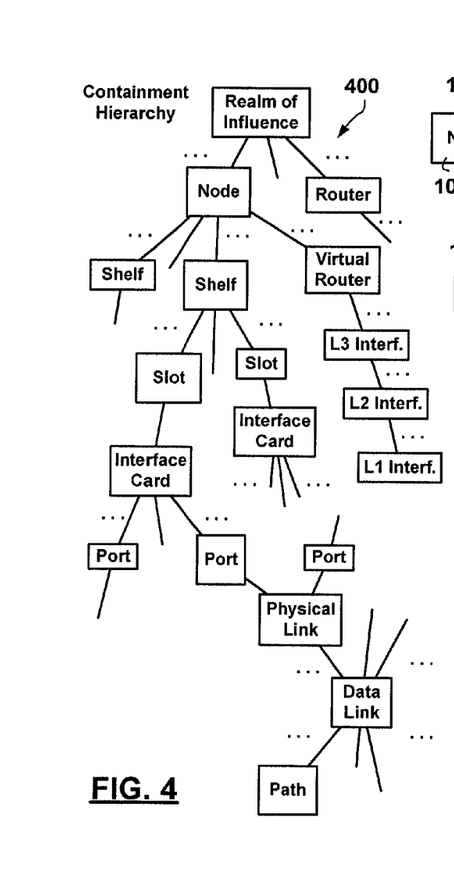
FIG. 4 is a schematic diagram showing an managed entity containment hierarchy used in providing the network management and service provisioning solution in accordance with the preferred embodiment of the invention.

The correspondence between a particular managed entity object instance 206 and the corresponding managed data network entity is provided via a unique CLI identification attribute (CLId). The value held by each CLIid attribute may be derived at run-time from the associations of the managed entity object instance 206 defining the containment hierarchy 400. It is possible that the CLIid derivation is not unique for a particular managed entity object instance 206. For example, the particular managed entity object instance 206 having a non-unique CLId can be configured as a subcomponent associated with multiple components of a data network node 102. Furthermore, managed entity object instances 206 such as physical links 108, paths 128, etc. always have two ends associated therewith. The configuration of physical links 108, paths 128, etc. is effected solely by configuring the ends thereof.

A CLId may have the following form:

<node- . . . -port- . . . > which is typically a string of identifiers—preferably human readable.

The invention is not is not limited to the CLId format shown. A CLId is not necessarily derived from the containment hiearchy. It may also simply be a name associated with a managed object entity, such as "SomeRouterInterface". A CLId may also be derived from other attribute values associated with a particular managed entity object instance. No CLId structure whatsoever is implied.

Other CLIattributes 264 may include: CLIreadUserID, CLIreadPassword, CLIwriteUserID, CLIwritePassword, internetAddress, etc. where relevant. CLIactions 266 may use the CLIattributes 264 as parameters.

Figure 5:
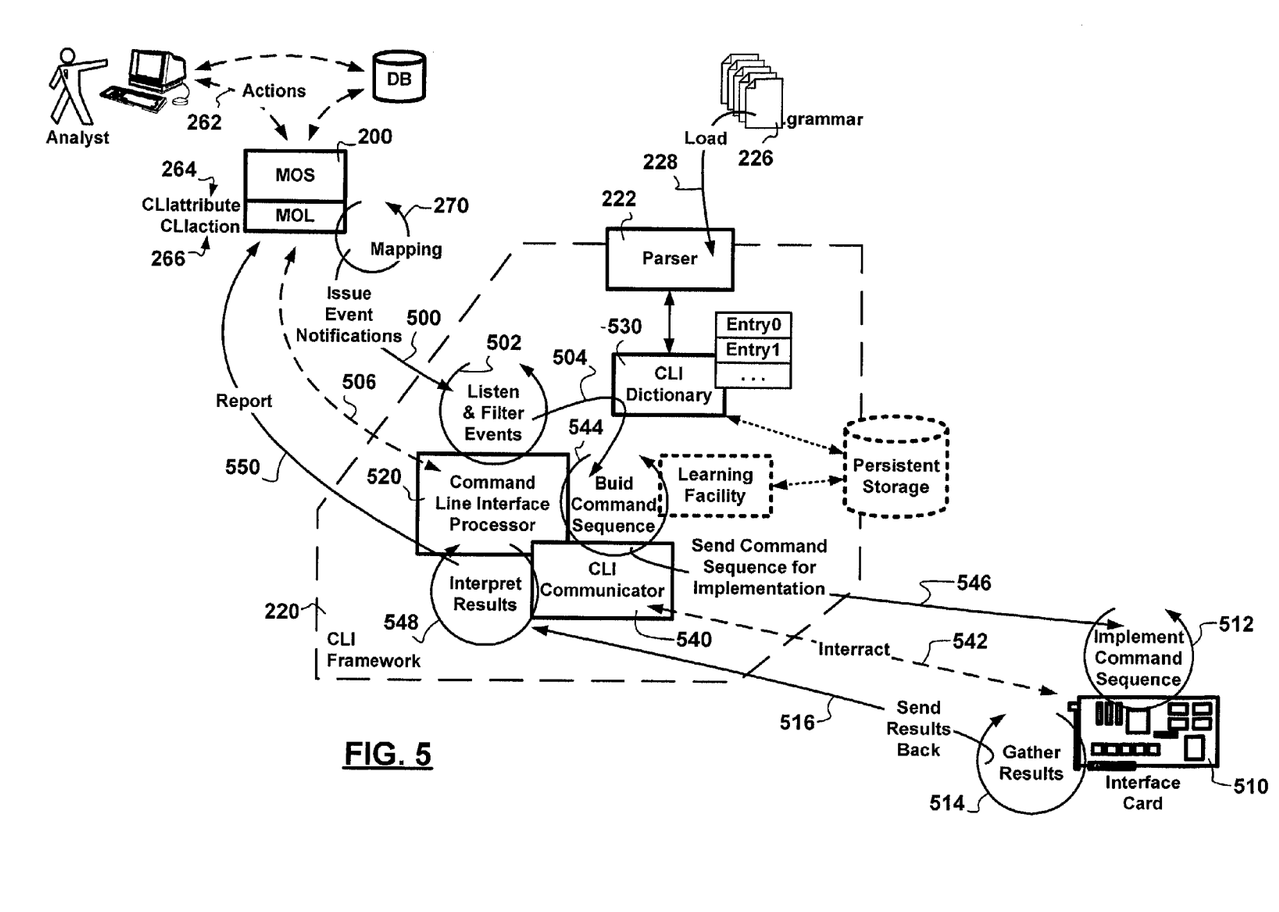
FIG. 5 is a schematic diagram showing interconnected components and process steps performed by the components in operating the invention.

FIG. 5 is a schematic diagram showing interconnected CLI framework components and process steps performed by the components in operating the invention.

The interaction between the MOS 200 and the CLI framework 220 may be implemented via exchanged messages requesting CLIactions 266 to be taken in effecting changes to the operational parameters of managed data network entities (in providing persistence support). For this purpose, the CLI framework 220 registers with the MOS 200 to be informed about changes to CLIattributes 264 of managed entity object instances 206. Changes to managed entity object instances 206 are event-notified 500 by the MOS 200 to the CLI framework 220.

The CLI framework 220 comprises: a CLI processor 520 (CLIP), a CLI dictionary 530, and CLI COMmunications module 540 (CLICOM).

In accordance with the invention, the CLI framework 220 is coded in a generic fashion and is adapted to load at run-time grammar files 226. Each grammar file 226 holds specifications of a CLI vocabulary and an associated grammar to be used in configuring and controlling at least one particular managed data network entity (providing persistence support). The grammar and vocabulary between other things, specify, without being limited to, the: CLI command names, associated parameters, valid parameter ranges, parameter typecasting rules, parameter conversions, parameter unit specifications, parameter unit conversions, as well as contexts in which the CLI commands may be issued.

In accordance with the preferred embodiment of the invention, the grammar files 226 are human-readable. When loaded the grammar files 226 are interpreted by a parser 222. In accordance with an exemplary implementation of the invention, the grammar files may be written in eXtensible Markup Language (XML).

Depending on the implementation, the grammar files 226 may have an interdependency but the invention is not limited thereto. Benefits of associations between grammar files 226 may be derived for grammar files 226 associated with managed data network entities provided by a common vendor.

In accordance with the preferred software development methodology the use of grammar files 226 enables a generic coding of the CLI framework 220—the use of additional grammar files 226 enables the extension of the interaction with additional CLI configurable data network entities with preferably little and ultimately no changes to the CLI framework 220 code.

The CLI vocabulary and grammar described in the grammar files 226 is compiled into the CLI dictionary 530. The CLI dictionary 530 further codifies the CLI commands, the relations between CLI commands, and how the commands map to managed data network entities 510. Facilities such as a persistent storage may be provided for the storage and loading of the CLI dictionary 530 between CLI framework 220 restarts. Persistence storage includes but is not limited to: XML files, relational databases, proprietary solutions, etc.

The CLI processor 520 receives notifications 500 from the MOS 200 including requested CLIactions 266 to be performed. Other notifications 500 may be received by the CLI processor 520 as the MOS 200 may provide additional functionality beyond the scope of the present description. In accordance with the invention, the CLI processor 520 therefore filters 502 all received notifications 500 to extract only notifications intended for the CLI framework 220.

Having received a notification 500, the CLI processor 520 makes use of CLImapping attribute(s) to query 504 CLI dictionary entries held in the CLI dictionary 530. In processing CLImapping attributes and CLI dictionary entries the CLI processor 520 may interact 506 with the MOS 200 to request further information necessary in implementing CLIactions 266. This interaction 506 may be used to determine a configuration context (mentioned above) for a particular CLIaction 266.

The CLI framework 220 interacts 542 with the corresponding field installed managed data network entity(ies) 510 via the CLICOM module 540 for each CLIaction 266 as well as if a particular CLIattribute 264 change requires persistence support.

A CLI command sequence is built 544 to implement the specific CLIaction 266 (CLIcreate, CLIupdate, CLIread, CLIdelete etc.) based on the grammar specified in corresponding CLI dictionary entries to operate on the managed data network entity 510.

The CLICOM module 540 sends 546 each CLI command sequence to the corresponding managed data network entity 510 for execution.

The CLICOM module 540 also handles all preliminary aspects of executing the CLI command sequence on the managed data network entity 510. The preliminary aspects alluded to include but are not limited to: recognizing prompts; and logging into the managed data network entity 510 using: the CLIreadUserID, CLIreadPassword, CLIwriteUserID, CLIwritePassword; in initializing a communication session. Communication sessions may include but are not limited to: TELNET sessions over the data transport network 100, virtual terminal sessions using direct management links, etc.

The managed data network entity 510, executes 512 each CLI command in the receive CLI command sequence. The execution of each CLI command may provide feedback. The managed data network entity 512 gathers the results 514 and conveys 516 the results back to the CLICOM module 540 via the established communication session. The gathering 514 and conveying of the results back to the CLICOM module 540 may be a side effect of monitoring of the execution of the CLI commands via the prompt monitoring function mentioned above.

The CLICOM module 540 interprets 548 the received (516) results and detects errors if any. The handing of detected errors may either be performed by the CLI processor 520 as specified in CLI dictionary entries, in which case further CLI command sequences may be built 544 and sent to the managed data network entity 510 for execution; or the detected errors may be reported 550 to the MOS 200 and perhaps the ultimately to the software application(s) 210.

In executing CLI command sequences, a configuration context change must be made between the implementation of CLIactions 266 associated with dissimilar configuration contexts. In accordance with an implementation of an exemplary embodiment of the invention, the configuration context change may include resetting the configuration context by using a configuration context reset CLI command as the first CLI command of a CLI command sequence corresponding to a CLIaction 266.

A learning facility may be implemented into the CLI framework 220 whereby CLI command sequences built 544 may be stored for subsequent use. In accordance with an exemplary implementation of the invention, to optimize notification (500) processing, selected CLIactions 266 may have corresponding CLImactions 266—where "mactions" (multiple actions) are decomposed into an undetermined number of CLIactions that could make use of the same CLI command sequence albeit with different CLI command parameters. For example, a CLImread action 266 requested on a routing table associated with an interface, would be performed as a sequence of CLIread actions 266: one for each entry in the routing table. The decomposition of the CLImaction 266 into multiple corresponding CLIactions 266 would be performed by the CLI processor 520 in the process of querying 504 the CLI dictionary 530 to build command sequence(s) 544.

In accordance with another exemplary implementation of the invention, atomic CLIread actions 266 may be defined on managed data network entities. In the process of querying 504 the CLI dictionary 530, the CLI processor 520 and the CLICOM module 540 would build 544 CLI command sequences to obtain values for every operational parameter associated with the managed data network entity.

In accordance with the software development methodology implementing the abstract coding of the software applications 210, special attention is given to create and delete actions. Basic create and delete actions are used for both physical managed data network entities as well as for logical managed data network entities. The connotations of "create" and "delete" imply the manipulation of the existence of a particular managed data network entity. Although this may be so for logical managed data network entities such as data links, paths 128, virtual routers, etc., a basic or CLI create/delete action performed on a physical managed data network entity is to be implemented as an inclusion/exclusion of the physical managed data network entity into/from the real of influence of the network management and service provisioning solution provided.

Figure 6:
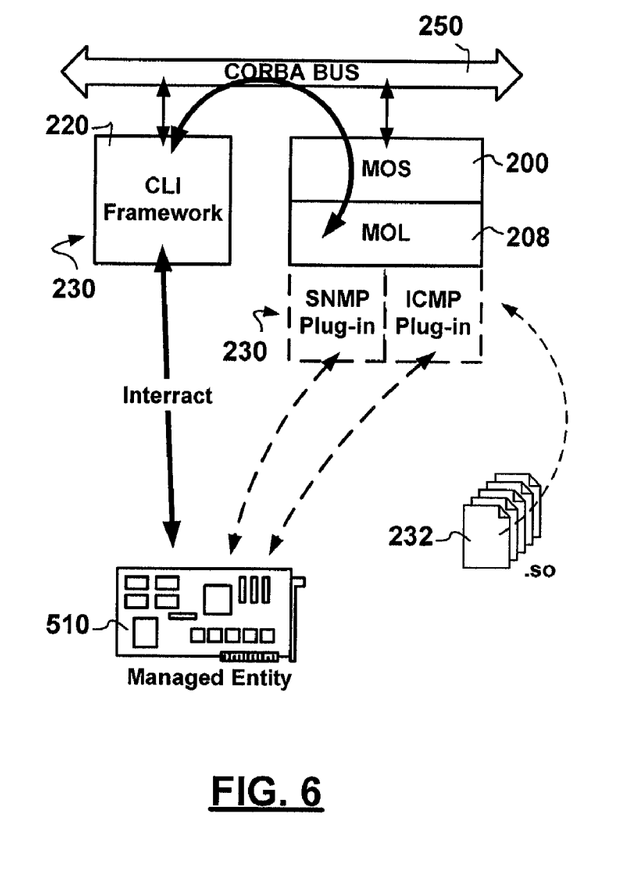
FIG. 6 is a schematic diagram showing an exemplary implementation of the preferred embodiment of the invention.
Figure 7:
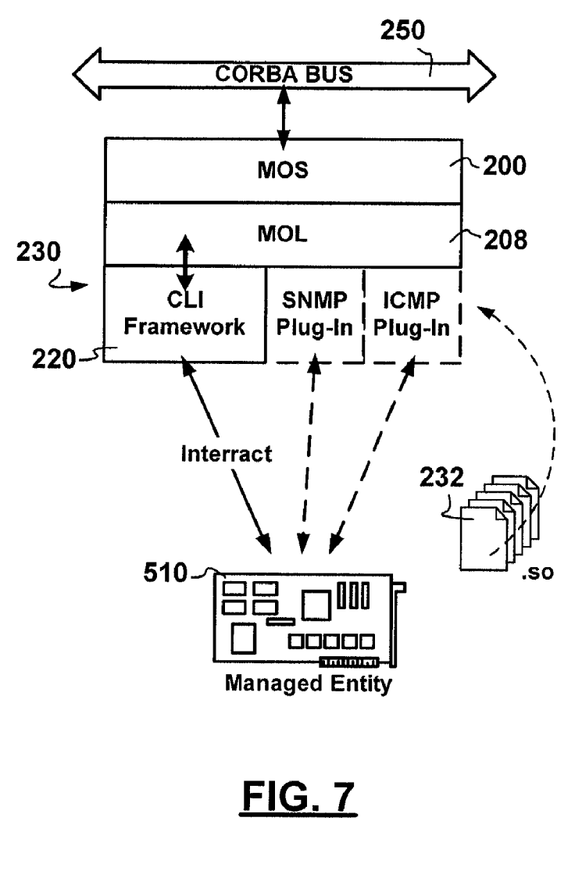
FIG. 7 is another schematic diagram showing another exemplary implementation of the preferred embodiment of the invention.

Although in the embodiments described above, the CLI framework 220 was presented as a separate enabling technology component 230 associated with the MOS 200 as shown in FIG. 6; the CLI framework 220 may be implemented as a plug-in enabling technology component (persistence plug-in) 230 to the MOS 200 as shown in FIG. 7. The invention is not limited to the above prosecuted embodiments.

In accordance with a preferred implementation of the invention, multiple actions 262 may be issued by a variety of software applications 210 and consequently multiple CLIactions 266 are preferably processed by the CLI framework 220 in parallel. Care is to be taken in coding such implementations to eliminate configuration conflicts. The elimination of configuration conflicts as well as prioritization of configuration changes may be implemented via queuing of CLIactions 266 to be processed by the CLI framework 220. The parallel processing requires the use of multi-threading, multi-tasking coding techniques known to persons of skill in the art and are beyond the scope of the present description.

The present invention automates the CLI command entry task in a network management and service provisioning environment comprised of diverse data network entities each of which has an associated CLI vocabulary. A CLI command dictionary 530 consolidates all data network entity specific CLI vocabularies and serves the CLI framework 220 with context specific CLI commands for building CLI command sequences. CLI command sequences are subsequently sent for execution by intended managed data network entities 510 while the execution thereof is monitored for feedback.

The embodiments presented are exemplary only and persons skilled in the art would appreciate that variations to the above described embodiments may be made without departing from the spirit of the invention. The scope of the invention is solely defined by the appended claims.

We claim:

1. A Command Line Interface (CLI) framework component of a Network Management System (NMS), the NMS managing a plurality of field installed managed communications network entities of a communications network, each field installed managed communications network entity being represented and modeled by an associated managed object instance stored in a managed objects database associated with the NMS, the CLI framework component comprising:
   a. a CLI dictionary codifying a plurality of managed communications network entity-specific CLI commands and maintaining at least one mapping between the managed communications network entity-specific CLI commands and a corresponding managed object type;
   b. a generic processor executing coded logic to:
      i. detect an event affecting a particular managed object instance;
      ii. responsive to the detected event selectively generate a sequence of CLI commands required to configure the field installed managed communications network entity associated with said managed object instance by consulting the CLI dictionary;
      iii. handle execution of said sequence of CLI commands at said field installed managed communications network entity, including interpreting CLI command execution results received from said field installed managed communications network entity; and
      iv. generating an error report based on an unsuccessful execution of any CLI commands as indicated by the execution results; and
   c. a communications module transmitting said sequence of CLI commands to said field installed managed communications network entity to be executed thereon, and conveying the execution results received from said field installed managed communications network entity to the generic processor,
   wherein a network management and service provisioning solution is provide making abstraction of managed communications network entity types.

2. The CLI framework component as claimed in claim 1, further comprising a parser for populating the CLI dictionary with CLI vocabulary and CLI grammar specifications for each managed object type extracted from at least one of a plurality of grammar files.

3. The CLI framework component as claimed in claim 2, wherein the parser loads a grammar file in the CLI dictionary pertinent to a corresponding managed object types on demand thereby expanding capabilities provided by the CLI framework component at run-time.

4. The CLI framework component as claimed in claim 2, wherein each grammar file comprises specifications of CLI vocabulary and CLI grammar used in configuring and controlling a particular field installed managed communications network entity enabling development, maintenance, update, deployment, and provisioning support for said particular field installed managed communications network entity.

5. The CLI framework component as claimed in claim 4, wherein the grammar files are eXtensible Markup Language (XML) files.

6. The framework components as claimed in claim 4, wherein each grammar file is a human readable file.

7. The CLI framework component as claimed in claim 1, wherein said CLI dictionary is stored on a persistent storage.

8. The CLI framework component as claimed in claim 1, wherein the CLI framework component is one of: a client entity, a server entity, a plug-in component entity, and a run-time loadable plug-in component entity associated with a managed object server entity used by the NMS in providing the network management and service provisioning solution.

9. A CLI framework component as claimed in claim 1, wherein the a managed of object server entity used in providing the management and service provisioning solution is adapted to exchange the at least notification with the CLI framework component.

10. The framework components as claimed in claim 1, further comprising an event notification filter providing the generic processor only with event notifications generated by events intended for the CLI framework component.

11. The CLI framework component as claimed in claim 10, further comprising a CLI command sequence learning facility storing said sequence of CLI commands for subsequent use, to improve processing of repeated actions.

12. The framework components as claimed in claim 1, wherein the CLI dictionary further comprises a plurality of dictionary entries holding CLI vocabulary and CLI grammar specifications for corresponding managed entity types.

13. A method of automatically configuring a field installed managed communications network entity in a communications network managed by a Network Management System (NMS), the field installed managed communications network entity being represented and modeled by a managed object instance stored in a managed objects database associated with the NMS, the method comprising:
   a. providing the NMS with a Command Line Interface (CLI) dictionary holding CLI vocabulary and CLI grammar specifications for a plurality of CLI commands used in interacting with corresponding managed object type;
   b. detecting a change in the information stored in the managed objects database fir said managed object instance;
   c. identifying a CLI dictionary entry in the CLI dictionary corresponding to the managed object type of the managed object instance;
   d. retrieving, based on the CLI dictionary entry, CLI commands required to effect the change to said field installed managed communications network entity;
   e. deriving from the retrieved CLI commands a sequence of commands required to configure the managed communications network entity;
   f. sending for execution each CLI command in the derived sequence of CLI commands to the field installed managed communications network entity;
   g. monitoring the execution of each CLI command sent;
   h. monitoring thea response of the field installed managed communications network entity to each executed CLI command in turn;

i. interpreting the response after execution of each CLI command; and j. generating an error report based on an unsuccessful execution of at least one CLI command.

14. The method as claimed in claim 13, wherein the change includes a desired change of at least on of: an operational parameter of said field installed managed communications network entity, an operational state of the filed field installed managed communications network entity, and a configuration of the field installed managed communications network entity.

15. The method as claimed in claim 13, further comprising selectively sending the a next CLI command in the sequence of CLI commands if an expected response was received subsequent to the execution of the one of previous CLI commands.

16. The method as claimed in claim 13, wherein prior to sending the CLI commands in the sequence of CLI commands to the field installed managed communications network entity for execution, the method further comprises establishing a communication session with the field installed managed communications network entity.

17. The method as claimed in claim 13, wherein providing the network management system with the CLI dictionary, the method comprises:

a. loading grammar files using a parser;

b. interpreting the grammar files to extract CLI vocabulary and CLI grammar specifications of CLI commands used in interacting with a managed communications network type; and c. populating CLI dictionary entries with the extracted CLI vocabulary and CLI grammar specifications, wherein additional CLI commands are added to the CLI dictionary providing for an extensible network management and service provisioning solution.

18. The method as claimed in claim 17, wherein loading grammar files further comprises selecting a grammar file for an demand loading thereof.

19. The method as claimed in claim 17 further comprising retrievably storing the CLI dictionary between restarts.

* * * * *

UNITED STATES PATENT AND TRADEMARK OFFICE
CERTIFICATE OF CORRECTION

PATENT NO. : 7,113,989 B2
APPLICATION NO. : 10/115900
DATED : September 26, 2006
INVENTOR(S) : Christopher Warren Murray et al.

It is certified that error appears in the above-identified patent and that said Letters Patent is hereby corrected as shown below:

Column 13: Claim 1 line 40: "is provide" should read --is provided--
Column 13: Claims 2-6, 17, and 18: "grammar file(s)" should read --.grammar file(s)--
Column 13: Claim 3 lines 3-4: "...managed object types on demand..." should read --managed object type at run-time to enable extended support for additional managed object types on demand...--
Column 14: Claim 4 line 7: "communications network entity" should read --communication network entity--
Column 14: Claim 6 line 1: "framework component" should read --CLI framework component--
Column 14: Claim 9 line 2: "the a managed of object" should read --the managed object--
Column 14: Claim 9 line 3: "the management and service provisioning" should read --the network management and service provisioning--
Column 14: Claim 9 line 4: "exchange the at least one notification" should read --exchange at least one notification--
Column 14: Claim 10 line 1: "CLI framework components" should read --CLI framework component--
Column 14: Claim 12 line 1: "framework components" should read --CLI framework component--
Column 14: Claim 13 line 13; "a change in the information" should read --a change in information--
Column 14: Claim 13 lines 23-24; "managed communications network entity" should read --managted communication network entity--
Column 14: Claim 13 line 29: "thea response" should read --a response--
Column 14: Claim 15 lines 4-5: "execution of the one of previous CLI commands" should read --execution of one of the CLI commands--.

UNITED STATES PATENT AND TRADEMARK OFFICE
CERTIFICATE OF CORRECTION

PATENT NO. : 7,113,989 B2
APPLICATION NO. : 10/115900
DATED : September 26, 2006
INVENTOR(S) : Christopher Warren Murray et al.

It is certified that error appears in the above-identified patent and that said Letters Patent is hereby corrected as shown below:

Column 16: Claim 18 line 3: "an demand loading" should read --on demand loading--

Signed and Sealed this

Second Day of October, 2007

JON W. DUDAS
*Director of the United States Patent and Trademark Office*